United States Patent
Liang et al.

(10) Patent No.: US 10,339,814 B2
(45) Date of Patent: Jul. 2, 2019

(54) AUTONOMOUS VEHICLES AS A SOCIAL NETWORK PLATFORM

(71) Applicants: Biyonka Liang, Newport Coast, CA (US); Ping Liang, Newport Coast, CA (US)

(72) Inventors: Biyonka Liang, Newport Coast, CA (US); Ping Liang, Newport Coast, CA (US)

(73) Assignee: Ping Liang, Newport Coast, CA (US)

( * ) Notice: Subject to any disclaimer, the term of this patent is extended or adjusted under 35 U.S.C. 154(b) by 29 days.

(21) Appl. No.: 15/592,151

(22) Filed: May 10, 2017

(65) Prior Publication Data

US 2018/0330622 A1    Nov. 15, 2018

(51) Int. Cl.
```
G08G 1/00      (2006.01)
G06Q 10/06     (2012.01)
G05D 1/02      (2006.01)
G08G 1/16      (2006.01)
G06Q 50/00     (2012.01)
H04W 4/21      (2018.01)
H04W 4/40      (2018.01)
G01S 13/93     (2006.01)
```

(52) U.S. Cl.
CPC ............ *G08G 1/22* (2013.01); *G05D 1/0291* (2013.01); *G06Q 10/06311* (2013.01); *G06Q 50/01* (2013.01); *G08G 1/163* (2013.01); *H04W 4/21* (2018.02); *H04W 4/40* (2018.02); *G01S 2013/9325* (2013.01)

(58) Field of Classification Search
CPC ........ G08G 1/22; G08G 1/163; G05D 1/0291; G06Q 10/06311; G06Q 50/01
See application file for complete search history.

(56) References Cited

U.S. PATENT DOCUMENTS

2017/0370731 A1* 12/2017 Bresnahan ............. G01C 21/34

* cited by examiner

*Primary Examiner* — Michael D Lang
(74) *Attorney, Agent, or Firm* — Guosheng Wang; United States Research and Patent Firm

(57) ABSTRACT

This invention describes a method, the information processing system and the autonomous vehicles that enable in-person socializing of passengers in multiple traveling autonomous vehicles. Under the collaborative control of one or more information processing system and on-bard controllers, multiple traveling autonomous vehicles carrying passengers who have matching interests or requests, overlapping travel routes and times are connected together mechanically while traveling at normal operating speed to establish a connected space to allow in-person interactions and socializing. A cluster of connected autonomous vehicles moves as one integrated vehicle.

32 Claims, 3 Drawing Sheets

AUTONOMOUS VEHICLES AS A SOCIAL NETWORK PLATFORM

FIELD OF INVENTION

This invention relates generally to controlling and connecting passenger-carrying autonomous vehicles, and more particularly, to autonomous vehicles, control and information management systems, and methods that enable passenger-carrying autonomous vehicles to be used as a social network platform.

BACKGROUND

Autonomous vehicles are expected to become a reality in the near future. It will free humans from the attention-demanding task of driving and allow them to work or play while traveling in autonomous vehicles. One basic human need is socializing. Social networking is an important part of current day life. Although online social networking is popular, it is no replacement of meeting in-person and in-person socializing is still desired by many.

When a person travels alone in an autonomous vehicle for an extended period, he may desire to socialize in-person with other people, either friends or people with common current interest, who are traveling, or with a small route-change can travel, on the same route for a sufficiently long portion of the trip. Similarly, when a small number of people in an autonomous vehicle are traveling for an extended period, they may wish to socialize in-person with a larger group of travelers along the same route. The travelers are unlikely to have exactly the same starting point and destination, so having a larger capacity autonomous vehicles make multiple pickups and drop-offs is inconvenient and wastes time. This invention meets the needs described above. There is no prior art that can do the same.

BRIEF DESCRIPTION OF DRAWINGS

Abbreviations used in the following list of drawings are defined in the next section which provides the detailed description of the embodiments of the invention.

DETAILED DESCRIPTION

Figure 1:
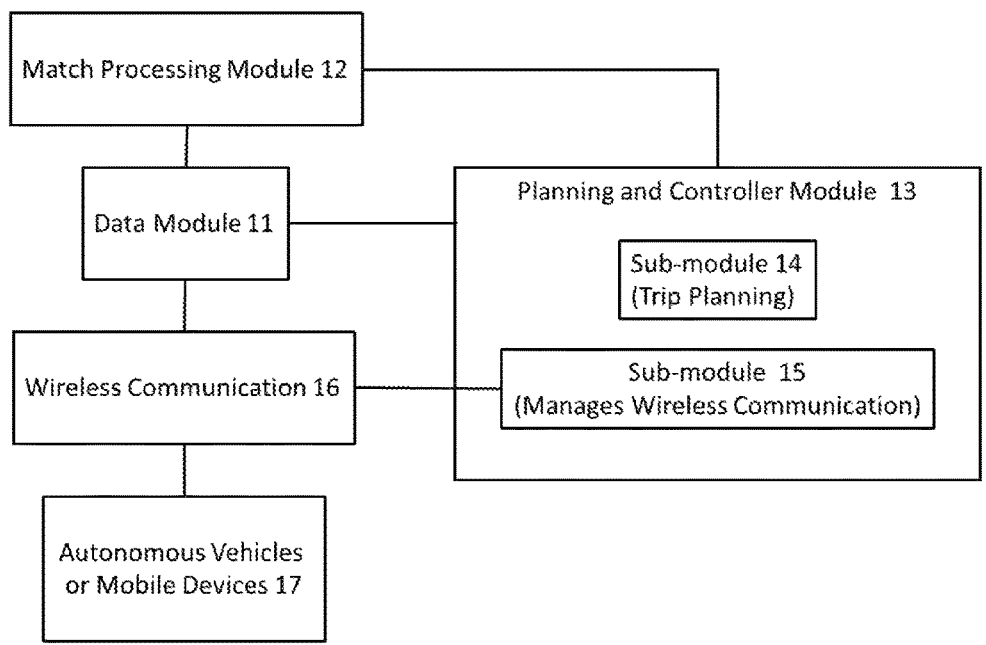
FIG. 1 shows an information processing system that enables and manages connecting autonomous vehicles for in-person socializing of passengers in multiple traveling autonomous vehicles.

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus or system element for performing the method step. Depending upon the implementation, the corresponding apparatus element may be configured in hardware, software, firmware or combinations thereof.

In the following, an autonomous vehicle is a vehicle that is driven by an autonomous system without the need of intervention from a human driver either all the time or part of the time. It may also be referred to as an autonomous driverless vehicle. The term "autonomous vehicle" is used to indicate either an autonomous vehicle that is scheduled to transport a passenger on a planned trip or an autonomous vehicle this currently traveling with the passenger onboard on an ongoing trip, while the term a "traveling autonomous vehicle" indicate only an autonomous vehicle this currently traveling with the passenger onboard on an ongoing trip. Correspondingly, passengers in an autonomous vehicle may mean passengers that will be traveling in an autonomous vehicle when the trip starts, or passengers who are currently travelling in an autonomous vehicle. An autonomous vehicle of this invention may travel on land, air, or water, or a combination of them. A cluster of autonomous vehicles means two or more autonomous vehicles that are connected by a mechanical joining mechanism such that they travel as one integrated entity. The term "in-person socializing" means two or more persons meet in a common space to allow person to person interactions such as direct conversation, visual and/or physical contact, or group activities such as holding meetings, playing games, working or playing collaboratively or competitively.

Passengers with the same origin and destination can travel in one vehicle to socialize in-person while traveling. However, that is quite restrictive. Without this invention, there are several options for passengers who do not share the same origin and/or destination to socialize in-person while traveling in vehicles. Passengers with different origin may travel in different vehicles to a gathering point, at least one or more passengers need to disembark from a vehicle they first travel in, and embark on another vehicle with the other passengers in a vehicle to continue the trip. Passengers with different destination may travel in the same vehicle to a break-up point, at least one or more passengers need to disembark from this vehicle and find another vehicle to continue the trip to reach their destination. Another method is the popular carpool, where one vehicle makes multiple stops to pick up passengers from different origins, and drops off passengers at different destinations. These methods are neither efficient nor convenient, do not allow spontaneous desire of in-person socializing nor automatic discovery of unknown opportunities of in-person socializing with friends, acquaintances or strangers who share common interest and desire to make new connections utilizing the traveling time.

One embodiment is a method or an information processing system that enables and manages connecting autonomous vehicles for in-person socializing of passengers in multiple traveling autonomous vehicles, as shown in FIG. 1.

Block 11 represents one or more data modules or a processing step that accept and/or store information of passengers on current interests, friendships, and/or requests for in-person socializing while traveling in an autonomous vehicle, and ongoing or planned traveling route and traveling time of passengers in two or more autonomous vehicles. Block 12 depicts one or more match processing modules or a processing step that find one or more matches of two or more passengers who are in two or more autonomous vehicles. A match is identified as two or more passengers having matching interests and/or matching requests for in-person socializing while traveling in an autonomous vehicle, and their traveling route and traveling time of ongoing or planned trips overlap but have different origin and/or destination. Because they have different origin and/or destination, in-motion mechanical connection and/or separation of the autonomous vehicles they travel in are required to enable them to have in-person socializing while traveling without slowing down or stopping their vehicles.

Box 13 shows one or more planning and controller modules or a processing step that comprise several submodules or sub-processing steps, including a sub-module or processing step 14 that computes a plan for two or more autonomous vehicles carrying passengers who are matched by the one or more match processing modules wherein the plan includes one or more of traveling route of each vehicle, start and time information of the trip of each vehicle, speed and lane position of the autonomous vehicles during the trip to enable the connection of two or more traveling autonomous vehicles, where, when and how two traveling autonomous vehicles complete a connection. It also includes a sub-module or processing step 15 that manages the wireless communication 16 with two or more traveling autonomous vehicles and/or devices carried by passengers 17 to collect information from and transmit information to such vehicles and/or passengers, communicate information to two or more autonomous vehicles 17 for them to execute the plan, receive updates from the two or more traveling autonomous vehicles and/or devices carried by passengers in the vehicles 17 and adapt the plan based on the received updates. When passengers have different destinations, the one or more planning and controller modules or a processing step 13 also includes in the plan further includes where, when and how two connected traveling autonomous vehicles make a separation.

For energy and space efficiency and for convenience, it may be preferable to have a large number of personal sized or small capacity autonomous vehicles carrying one or two passengers. In one embodiment, when passengers in small autonomous vehicles with only one or a small number of passengers wish to spend time with fellow travelers for in-person socializing, two or more such vehicles are mechanically connected through mechanical joining mechanisms while the autonomous vehicles are traveling at normal traveling speed and compartments of the connected autonomous vehicles are connected into one contained space in which passengers in the connected vehicles can socialize in person. Completion of the mechanical joining at normal travel speed range does not extend travel time and does not slow down the traffic flow of other vehicles sharing the road with the autonomous vehicles undergoing the mechanical joining connection.

In another embodiment, the one or more planning and controller modules or a processing step produce a plan in which one or more personal sized or small capacity autonomous vehicles are connected to a larger capacity autonomous vehicle so that passengers in the personal sized or small capacity autonomous vehicle can board or be transferred to the larger capacity autonomous vehicle and socialize in person with passengers who are already traveling on the larger capacity autonomous vehicle, or are or will board the larger capacity autonomous vehicle when their autonomous vehicles join with the larger capacity autonomous vehicle. Furthermore, the one or more planning and controller modules or a processing step include in the plan separation of the one or more small capacity autonomous vehicles from the large capacity autonomous vehicle after the passengers on the one or more small capacity autonomous vehicles have transferred to the large capacity autonomous vehicle.

The one or more match processing modules or a processing step further present a search interface for passengers in two or more autonomous vehicles to search for passengers in other vehicles who share a route or portion of route for potential in-person socializing either prior to, upon or after the start of the trip, present an interface for the passengers to select among the search results, and sends the requests for in-person connection to the selected passengers in other one or more vehicles.

Furthermore, the one or more match processing modules or a processing step can receive a request for in-person socializing from passengers in one autonomous vehicle and transmit and present it to one or more passengers in a second autonomous vehicle when one or more passengers in a first autonomous vehicle select one or more passengers to request in the second autonomous vehicle for in-person socializing; and initiating the coordination of the connection of the traveling autonomous vehicles after receiving confirmation of acceptance of the in-person socializing request and when the two vehicles share an overlapping route over a time period, wherein the selection by one or more passengers in the first autonomous vehicle and presentation of the request to the one or more passengers in the second autonomous vehicle occur either prior to, upon or after the start of the trips.

In another embodiment, the one or more match processing modules or a processing step transmit and present a request for in-person socializing to one or more passengers in both a first autonomous vehicle and a second autonomous vehicle when one or more passengers in each autonomous vehicle select one or more passengers in the other autonomous vehicle to request for in-person socializing. After receiving confirmation of acceptance of the in-person socializing request from one or more passengers in both autonomous vehicles and when the two vehicles share an overlapping route over a time period, the one or more planning and controller modules or a processing step initiate the coordination of the connection of the traveling autonomous vehicles. Note that the selection by one or more passengers in each autonomous vehicle and presentation of the request to the one or more passengers in each autonomous vehicle can occur either prior to, upon or after the start of the trips.

In one embodiment, the information processing system presents one or more recommendations for in-person socializing to passengers in two or more autonomous vehicles, receives their decision of whether to accept one or more of the recommendations and records as a match for in-person connection when passengers in two or more autonomous vehicles accept a recommendation of connection of the two or more autonomous vehicles. The presentation of the recommendation, receiving of the decisions and recording of the matches occur either prior to, upon or after the start of the trips.

The information processing system initiates the coordination of the connection of two or more autonomous vehicles and communicates information to the two or more autonomous vehicles for them to execute the plan after having received confirmation from passengers from the two or more traveling autonomous vehicles that they wish to connect for in-person socializing while traveling.

After the coordination of connection of two or more autonomous vehicles have started or even when the mechanical joining mechanism are being engaged, one or more passengers in an autonomous vehicle may change mind. One embodiment cancels an ongoing connection procedure of connecting two or more autonomous vehicles upon receiving a command of cancelation from a passenger in one of the traveling autonomous vehicles to be connected.

Another embodiment is a separation procedure for an autonomous vehicle that is connected to one or more other autonomous vehicle to separate from the cluster of connected autonomous vehicles. This can happen either because the travel route of some passengers no longer overlaps with the rest of the passengers beyond a point on the travel route or some passengers no longer wish to continue the in-person socializing with the passengers in other connected autonomous vehicles. In these cases, a separation procedure for a first autonomous vehicle in a cluster of two or more connected autonomous vehicles to disconnect from the other vehicle(s) in the cluster can be started upon receiving a command of separation from one or more passengers in the first autonomous vehicle, or when the information processing system informs an autonomous vehicle to make a separation or provides the autonomous vehicles in a connected cluster with a plan that includes where, when and how a connected traveling autonomous vehicle makes a separation from a cluster of connected vehicles.

Figure 2:
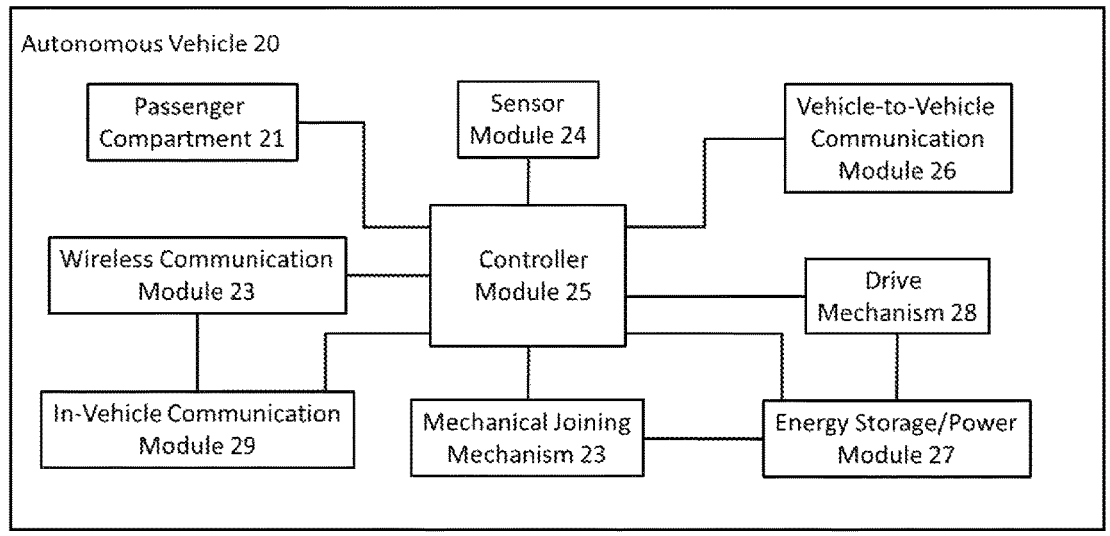
FIG. 2 shows an autonomous vehicle capable of connecting to one or more autonomous vehicles for in-person socializing of passengers in multiple traveling autonomous vehicles.

One embodiment is an autonomous vehicle capable of connecting to one or more autonomous vehicles for in-person socializing of passengers in multiple traveling autonomous vehicles, whose system block diagram is shown in FIG. 2. The autonomous vehicle 20 has a passenger compartment 21 that can hold one or more passengers. To save travel time and to avoid disruption to traffic, it is desired that autonomous vehicles can join and connect their passenger compartments while the vehicles are travelling at normal speed range. To accomplish this, the autonomous vehicle is equipped with a mechanical joining mechanism to allow it to connect with the mechanical joining mechanism of another autonomous vehicle while both are travelling at speed in normal operating range. The mechanical joining mechanism also include the mechanism for the passenger compartments of the connected autonomous vehicles be connected into a connected space to allow in-person interactions and/or physical movement of the passengers in this common space.

There can be autonomous vehicles with different capacity, some with small passenger compartment holding one or two passengers, some large passenger compartment holding four or more passengers. Small capacity autonomous vehicles provide energy and space efficiency and convenience to transport individual or small number of passengers, while large capacity autonomous vehicles provide energy and space efficiency and enable close contact in-person socializing when a large group of passengers share travel overlapping route.

Figure 3:
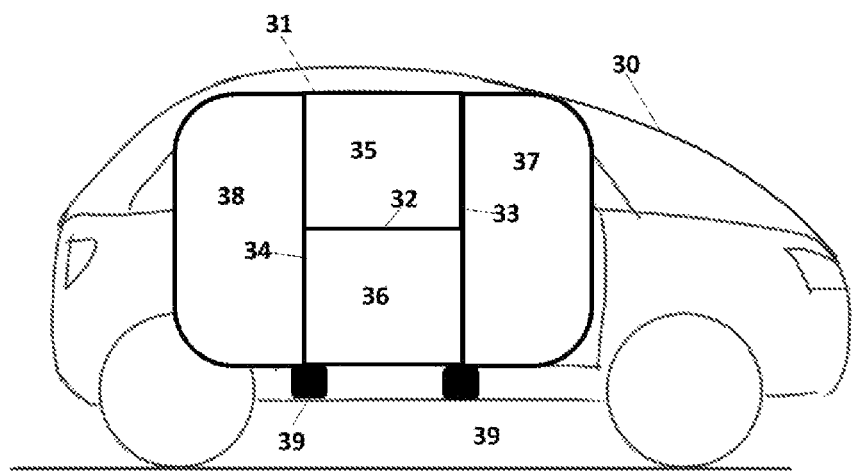
FIG. 3 shows one implementation of a mechanical joining mechanism for two autonomous vehicles to connect on the side.
Figure 3:
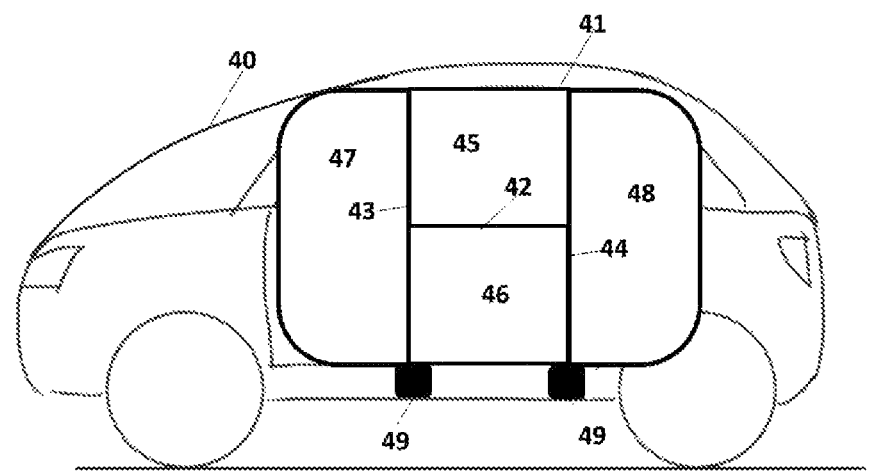
Figure 3:
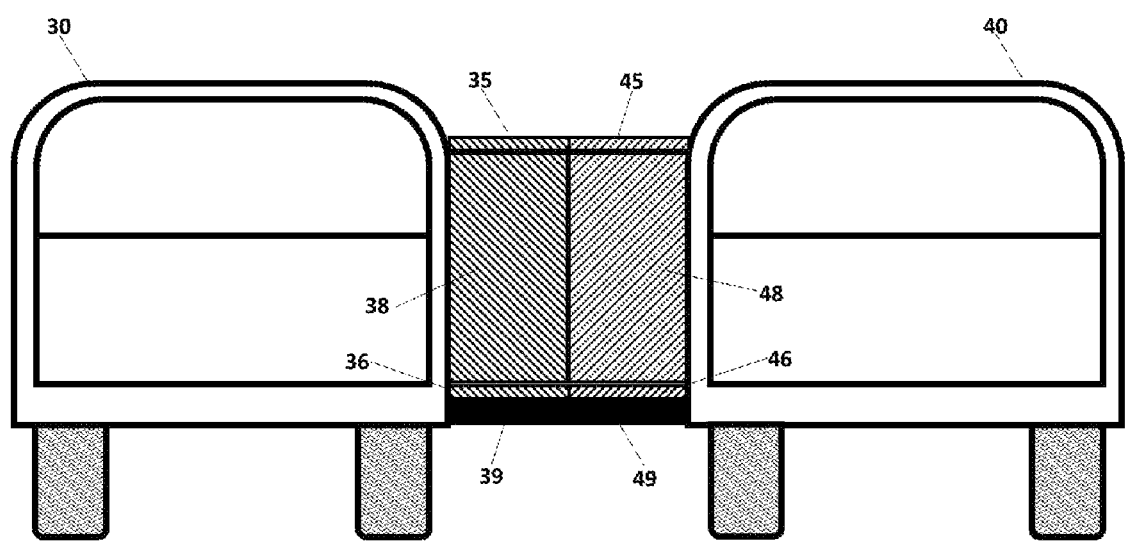

One implementation of a mechanical joining mechanism 22 for two autonomous vehicles to connect on the side is shown in FIG. 3. A side panel 31 on one side of a first autonomous vehicle 30 opens up along the middle horizontal line 32 and the two vertical lines 33 and 34 so that it forms four sides, 35 on the top as part of a roof, 36 on the bottom as part of a floor, 37 in the front and 38 in the rear become part of the front and back sides of the connecting compartment. On a second autonomous vehicle 40 to be connected with the first autonomous vehicle, a side panel 41 on the corresponding side of the second autonomous vehicle opens up along the middle horizontal line 42 and the two vertical lines 43 and 44 so that it forms four sides, 45 on the top as part of a roof, 46 on the bottom as part of a floor, 47 in the front and 48 in the rear become part of the front and back sides of the connecting compartment. When the two autonomous vehicles are joining together, the joining mechanisms on the opened-up side panels 35 to 38 on the first autonomous vehicle and 45 to 48 on the second autonomous vehicle are engaged, then securely locked, with 35 connected and locked with 45, 36 connected and locked with 46, 37 connected and locked with 47, and 38 connected and locked with 48. Reinforcement beams 39 and 49 that are normally hidden under the passenger compartments can also be used to strengthen the mechanical joining of the two autonomous vehicles. At the time of mechanical connection, the reinforcement beams 39 and 49 extend out from under the passenger compartments and are mechanically joined and locked.

Figure 4:
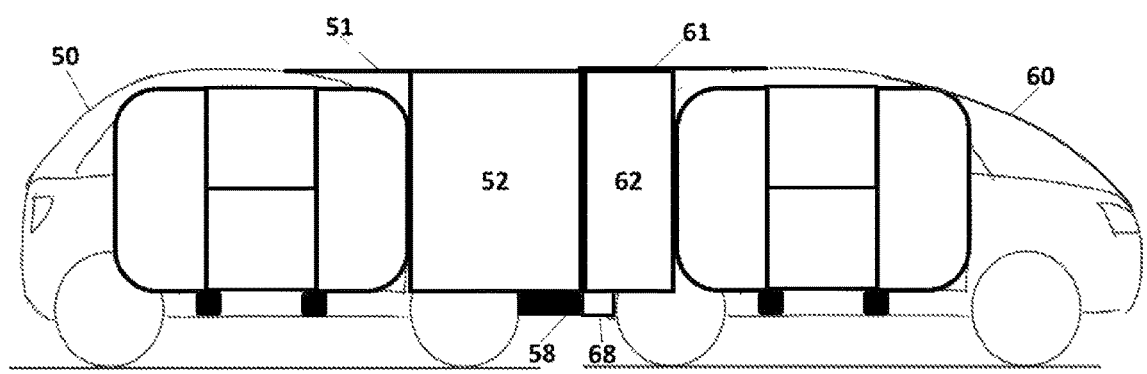
FIG. 4 shows one implementation of a mechanical joining mechanism for two autonomous vehicles to connect in a front-back connection.

Similarly, a first autonomous vehicle may also connect to a second autonomous vehicle in a front-rear connection, as shown in FIG. 4. The front panel on a first autonomous vehicle 50 opens up to form the top 51, left and right sides 52 of a first part of the connecting compartment. On a second autonomous vehicle 60 to be connected with the first autonomous vehicle, the back panel opens up to form the top 61, left and right sides 62 of a second part of the connecting compartment. When the two autonomous vehicles are joining together, the joining mechanisms on the opened-up front panels 51 and 52 on the first autonomous vehicle and the opened-up back panels 61 and 62 on the second autonomous vehicle are engaged, then securely locked, with 51 connected and locked with 61, and 52 connected and locked with 52. An extension 58 of the bottom frame at the front of the first autonomous vehicle extends and lock into a receptacle 68 at rear of the bottom frame of the second autonomous vehicle to form the floor of the connected compartment. The shapes of the panels 51, 52, 61, and 62 can be changed, extended or shortened in order to form a complete or well enclosed connected compartment. In one embodiment to allow the front-rear connection, the luggage compartment, the energy storage module or power module, the electrical or mechanical drive mechanism etc. can be located below or above the passenger compartment, or on one or both sides of the front and/or back of the autonomous vehicle. In one embodiment, the front of the bottom frame of the first autonomous vehicle securely connects and locks with the back of the bottom frame of the second autonomous vehicle so the two vehicles move as one connected vehicle. However, the front panel of the first autonomous vehicle and the back panel of the second autonomous vehicle do not open up. Instead, a side corridor is formed by connecting a side extension compartment of the first autonomous vehicle with a side extension compartment of the second autonomous vehicle. In this embodiment, the front and back portions of an autonomous vehicle can continue to be used to hold electrical and/or mechanical components of the vehicle or used as a luggage compartment.

When two or more autonomous vehicles are connected, their passenger compartments become connected to allow in-person interaction between passengers in the connected autonomous vehicles. It may further allow a passenger in one autonomous vehicle to move to another connected autonomous vehicle. There are other mechanical joining mechanisms that can achieve the same purpose and are not described here. One such design uses panels and beams that are normally hidden in the frame of the vehicle and extends them out to join and lock with the corresponding panels and beams extended from another vehicle to complete the mechanical joining and connection of the two vehicles and their passenger compartments. Although the descriptions and figures are for land vehicles, a person skilled in the art can extend and modify the design to vehicles that travel in air and/or water based on the same design principles.

The mechanical joining mechanism can be separated when under the control of the controller module, which starts a separation procedure for the autonomous vehicle in a cluster of two or more connected autonomous vehicles to disconnect from the other vehicle(s) in the cluster upon receiving a command of separation from one or more passengers in the autonomous vehicle. The controller module can also start a separation procedure for the autonomous vehicle in a cluster of two or more connected autonomous vehicles to disconnect from the other vehicle(s) in the cluster upon receiving a command of separation from the one or more information processing systems through a wireless communication module 23.

The autonomous vehicle contains a wireless communication module 23 to communicate with one or more information processing systems. The wireless communication can be accomplished through one or more mobile communication networks. The one or more information processing systems manage the matching of passengers for in-person socializing while traveling and the connection of autonomous vehicles, and provide the information or plan needed for the autonomous vehicle to connect to another autonomous vehicle.

The autonomous vehicle contains a sensor module 24 that provides the sensory information needed for fully or partial autonomous driving or assisted driving, measures the spatial and temporal information of an autonomous vehicle to be joined and provides sensory feedback to a controller module 25. Furthermore, it contains a vehicle-to-vehicle communication module 26 that identifies and communicates with the autonomous vehicle to be joined to collaborate on the connection of the mechanical joining mechanisms. The controller module 25 has the overall control of the autonomous vehicle, is responsible for executing a trip plan, controls the process to connect to one or more other autonomous vehicles, and controls the mechanical joining mechanism to connect with the mechanical joining mechanism of another autonomous vehicle. Furthermore, in a cluster of two or more connected autonomous vehicles, the controller module of each autonomous vehicle works in synchrony with other controller modules and controls its drive mechanism to collaborate with the drive mechanism(s) of the other autonomous vehicles in the cluster so that the cluster moves as one integrated autonomous vehicle. With the above embodiments, under the collaborative control of one or more information processing system and the on-board controller modules, multiple traveling autonomous vehicles carrying passengers who have matching interests or requests, overlapping travel routes and times are connected together mechanically while traveling at normal operating speed to establish a connected space to allow in-person interactions and socializing. The controller module can also abort an ongoing connection procedure upon receiving a command of cancelation from one or more passengers in the autonomous vehicle or from one or more information processing systems that manages the in-person socializing of passengers in traveling autonomous vehicles.

As is required of all transportation vehicles, the autonomous vehicle must be equipped with an energy storage module and/or a power module 27 that can receive or generate power from the environment to provide the power source for a drive mechanism 28 to converts the power to produce mechanical motion to propel the autonomous vehicle.

The autonomous vehicle can further be equipped with an in-vehicle communication module 29 that communicates with a personal mobile or wearable device carried by a passenger to accept route information, request for in-person socializing, personal information, or command to the autonomous vehicle transmitted by the personal mobile or wearable device.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method of enabling and managing in-person socializing of passengers in multiple traveling autonomous vehicles comprising
    accepting and/or storing information of passengers on current interests, friendships, and/or requests for in-person socializing while traveling in an autonomous vehicle, and ongoing or planned traveling route and traveling time of passengers in two or more autonomous vehicles;
    performing match processing to find one or more matches of two or more passengers who are in two or more autonomous vehicles for in-person socializing while traveling in an autonomous vehicle, and overlapping traveling route and traveling time of ongoing or planned trips;
    managing the wireless communication with two or more traveling autonomous vehicles and/or devices carried by passengers in the vehicles to collect information from and transmit information to such vehicles and/or passengers;
    computing a plan for two or more autonomous vehicles carrying passengers who are matched by match processing wherein the plan includes one or more of traveling route and time information of each vehicle, and information for two traveling autonomous vehicles to complete a connection;
    using one or more planning and controller modules of an information processing system to initiate a coordination of connection of said two or more autonomous vehicles and to communicate information to said two or more autonomous vehicles for them to execute the plan;
    receiving updates from two or more traveling autonomous vehicles and/or devices carried by passengers in the vehicles and adapt the plan based on the received updates; and
    using one or more planning and controller modules of an information processing system to control speed and lane position of said two or more autonomous vehicles during the trip and to connect said two or more autonomous vehicles while said two or more autonomous vehicles are still moving or in-motion.

2. The method in claim 1 wherein the plan further includes where, when and how two connected moving or in-motion autonomous vehicles make a separation.

3. The method in claim 1 wherein the plan further includes using a small capacity autonomous vehicle to carry passengers, connecting one or more small capacity autonomous vehicles to a large capacity autonomous vehicle and managing the transferring of passengers in the one or more small capacity autonomous vehicles to the large capacity autonomous vehicle.

4. The method in claim 3 wherein the plan further includes separation of the one or more small capacity autonomous vehicles from the large capacity autonomous vehicle after the passengers on the one or more small capacity autonomous vehicles have transferred to the large capacity autonomous vehicle.

5. The method in claim 1 further comprising presenting a search interface for passengers in two or more autonomous vehicles to search for passengers in other vehicles who share a route or portion of route for potential in-person socializing either prior to, upon or after the start of the trip; presenting an interface for the passengers to select among the search results; and sending the requests for in-person connection to the selected passengers in other one or more vehicles.

6. The method in claim 1 further comprising transmitting and presenting a request for in-person socializing to one or more passengers in a second autonomous vehicle when one or more passengers in a first autonomous vehicle select one or more passengers in the second autonomous vehicle to request for in-person socializing; and initiating the coordination of the connection of the moving or in-motion autonomous vehicles after receiving confirmation of acceptance of the in-person socializing request and when the two vehicles share an overlapping route over a time period, wherein the selection by one or more passengers in the first autonomous vehicle and presentation of the request to the one or more passengers in the second autonomous vehicle occur either prior to, upon or after the start of the trips.

7. The method in claim 1 further comprising transmitting and presenting a request for in-person socializing to one or more passengers in both a first autonomous vehicle and a second autonomous vehicle when one or more passengers in each autonomous vehicle select one or more passengers in the other autonomous vehicle for in-person socializing; and initiating the coordination of the connection of the moving or in-motion autonomous vehicles after receiving confirmation of acceptance of the in-person socializing request from one or more passengers in both autonomous vehicles and when the two vehicles share an overlapping route over a time period, wherein the selection by one or more passengers in each autonomous vehicle and presentation of the request to the one or more passengers in each autonomous vehicle occur either prior to, upon or after the start of the trips.

8. The method in claim 1 further comprising presenting one or more recommendations for in-person socializing to passengers in two or more autonomous vehicles; receiving their decision of whether to accept one or more of the recommendations; and recording as a match for in-person connection when passengers in two or more autonomous vehicles accept a recommendation of connection of the two or more autonomous vehicles, wherein the presentation of the recommendation, receiving of the decisions and recording of the matches occur either prior to, upon or after the start of the trips.

9. The method in claim 1 further comprising cancelling an ongoing connection procedure of connecting two or more autonomous vehicles upon receiving a command of cancelation from a passenger in one of the moving or in-motion autonomous vehicles to be connected.

10. The method in claim 1 further comprising starting a separation procedure for a first autonomous vehicle in a cluster of two or more connected autonomous vehicles to disconnect from the other vehicle(s) in the cluster upon receiving a command of separation from one or more passengers in the first autonomous vehicle.

11. An information processing system for managing and connecting autonomous vehicles to enable in-person socializing of passengers in multiple traveling autonomous vehicles comprising One or more data modules that accept and/or store information of passengers on current interests, friendships, and/or requests for in-person socializing while traveling in an autonomous vehicle, and ongoing or planned traveling route and traveling time of passengers in two or more autonomous vehicles;

One or more match processing modules that find one or more matches of two or more passengers who are in two or more autonomous vehicles for in-person socializing while traveling in an autonomous vehicle, and overlapping traveling route and traveling time of ongoing or planned trips;

One or more planning and controller modules that compute a plan for two or more autonomous vehicles carrying passengers who are matched by the one or more match processing modules wherein the plan includes one or more of traveling route and time information of each vehicle, and information for two traveling autonomous vehicles to complete a connection, manage the wireless communication with two or more traveling autonomous vehicles and/or devices carried by passengers to collect information from and transmit information to such vehicles and/or passengers, initiate a coordination of connection of said two or more autonomous vehicles, communicate information to two or more autonomous vehicles for them to execute the plan, receive updates from, the two or more traveling autonomous vehicles and/or devices carried by passengers in the vehicles and adapt the plan based on the received updates, and control speed and lane position of said autonomous vehicles during the trip and connect said autonomous vehicles while said autonomous vehicles are still moving or in-motion.

12. The information processing system in claim 11 wherein the plan further includes where, when and how two connected moving or in-motion autonomous vehicles make a separation.

13. The information processing system in claim 11 wherein the plan further includes using a small capacity autonomous vehicle to carry passengers, connecting one or more small capacity autonomous vehicles to a large capacity autonomous vehicle and managing the transferring of passengers in the one or more small capacity autonomous vehicles to the large capacity autonomous vehicle.

14. The information processing system in claim 13 wherein the plan further includes separation of the one or more small capacity autonomous vehicles from the large capacity autonomous vehicle after the passengers on the one or more small capacity autonomous vehicles have transferred to the large capacity autonomous vehicle.

15. The information processing system in claim 11 wherein the one or more match processing modules further present a search interface for passengers in two or more autonomous vehicles to search for passengers in other vehicles who share a route or portion of route for potential in-person socializing either prior to, upon or after the start of the trip; present an interface for the passengers to select among the search results; and send the requests for in-person connection to the selected passengers in other one or more vehicles.

16. The information processing system in claim 11 wherein the one or more match processing modules further cause a request for in-person socializing to be transmitted and presented to one or more passengers in a second autonomous vehicle when one or more passengers in a first autonomous vehicle select one or more passengers in the second autonomous vehicle to request for in-person socializing, and the one or more planning and controller modules initiate the coordination of the connection of the moving or in-motion autonomous vehicles after receiving confirmation of acceptance of the in-person socializing request and when the two vehicles share an overlapping route over a time period, wherein the selection by one or more passengers in the first autonomous vehicle and presentation of the request to the one or more passengers in the second autonomous vehicle occur either prior to, upon or after the start of the trips.

17. The information processing system in claim 11 wherein the one or more match processing modules further cause a request for in-person socializing to be transmitted and presented to one or more passengers in both a first autonomous vehicle and a second autonomous vehicle when one or more passengers in each autonomous vehicle select one or more passengers in the other autonomous vehicle to request for in-person socializing, and the one or more planning and controller modules initiate the coordination of the connection of the moving or in-motion autonomous vehicles after receiving confirmation of acceptance of the in-person socializing request from one or more passengers in both autonomous vehicles and when the two vehicles share an overlapping route over a time period, wherein the selection by one or more passengers in each autonomous vehicle and presentation of the request to the one or more passengers in each autonomous vehicle occur either prior to, upon or after the start of the trips.

18. The information processing system in claim 11 wherein the one or more match processing modules further present one or more recommendations for in-person socializing to passengers in two or more autonomous vehicles, receive their decision of whether to accept one or more of the recommendations, and record as a match for in-person connection when passengers in two or more autonomous vehicles accept a recommendation of connection of the two or more autonomous vehicles, wherein the presentation of the recommendation, receiving of the decisions and recording of the matches occur either prior to, upon or after the start of the trips.

19. The information processing system in claim 11 wherein the one or more planning and controller modules coordinates two or more moving or in-motion autonomous vehicles to cancel an ongoing connection procedure of connecting two or more autonomous vehicles upon receiving a command of cancelation from a passenger in one of the moving or in-motion autonomous vehicles to be connected.

20. The information processing system in claim 11 wherein the one or more planning and controller modules starts a separation procedure for a first autonomous vehicle in a cluster of two or more connected autonomous vehicles to disconnect from the other vehicle(s) in the cluster upon receiving a command of separation from one or more passengers in the first autonomous vehicle.

21. An autonomous vehicle capable of connecting to one or more autonomous vehicles for in-person socializing of passengers in multiple traveling autonomous vehicles comprising
a passenger compartment holding one or more passengers;
an energy storage module and/or a power module that can receive or generate power from the environment;
a drive mechanism that converts the energy source in the energy storage module or the power from the power module to produce mechanical motion to propel the autonomous vehicle;
a mechanical joining mechanism capable of connecting with another autonomous vehicle while both are moving or in-motion;
a controller module that exerts overall control of the autonomous vehicle, executes a trip plan, initiates a coordination of connection with other autonomous vehicle(s), controls the process of connecting to one or more other autonomous vehicles, controls speed and lane position of the autonomous vehicles during the trip, and controls the mechanical joining mechanism to connect with the mechanical joining mechanism of another autonomous vehicle while the autonomous vehicles are still moving or in-motion; and,
a wireless communication module to communicate through one or more mobile communication networks with one or more information processing systems from which to receive information needed for connecting to another autonomous vehicle for in-person socializing while moving or in-motion.

22. The autonomous vehicle of claim 21 further comprising a sensor module that provides the sensory information for fully autonomous driving or assisted driving, measures the spatial and temporal information, of an autonomous vehicle to be joined while the vehicles are moving or in-motion, and provides sensory feedback to the controller module.

23. The autonomous vehicle of claim 21 further comprising a vehicle-to-vehicle communication module that identifies and communicates with the autonomous vehicle to be joined to collaborate on the connection of the mechanical joining mechanisms while the vehicles are moving or in-motion.

24. The autonomous vehicle of claim 21 wherein the controller module of each autonomous vehicle in a cluster of two or more connected autonomous vehicles communicates with the vehicles in the cluster and controls its drive mechanism to collaborate with the drive mechanism(s) of the other autonomous vehicles in the cluster so that the drive mechanisms of vehicles in the cluster collectively move the cluster as one integrated autonomous vehicle.

25. The autonomous vehicle of claim 21 wherein its passenger compartment becomes connected to the passenger compartment of an autonomous vehicle to which it is connected to allow in-person interaction between passengers in the connected autonomous vehicles.

26. The autonomous vehicle of claim 21 wherein its passenger compartment connects to the passenger compartment of an autonomous vehicle to which it is connected to allow a passenger in one autonomous vehicle to move to another connected autonomous vehicle.

27. The autonomous vehicle of claim 21 further comprising an in-vehicle communication module that communicates with a personal mobile or wearable device carried by a passenger to accept route information, request for in-person socializing, personal information, or command to the autonomous vehicle transmitted by the personal mobile or wearable device.

28. The autonomous vehicle of claim 21 wherein the controller module aborts an ongoing connection procedure upon receiving a command of cancelation from one or more passengers in the autonomous vehicle.

29. The autonomous vehicle of claim 21 wherein the controller module starts a separation procedure for the autonomous vehicle in a cluster of two or more connected autonomous vehicles to disconnect from the other vehicle(s) in the cluster upon receiving a command of separation from one or more passengers in the autonomous vehicle.

30. The autonomous vehicle of claim 21 wherein the controller module starts a separation procedure for the autonomous vehicle in a cluster of two or more connected autonomous vehicles to disconnect from the other vehicle(s) in the cluster upon receiving a command of separation from the one or more information processing systems through the wireless communication module.

31. The autonomous vehicle of claim 21 wherein the passenger compartment is of small capacity holding one or two passengers.

32. The autonomous vehicle of claim 21 wherein the passenger compartment is of large capacity holding four or more passengers.

* * * * *